United States Patent Office 3,672,868
Patented June 27, 1972

3,672,868
ZINC DUST FOR REMOVAL OF COBALT FROM ELECTROLYTE
Tokushige Hasegawa, Narashino, Kuninobu Makimoto, Aizu-Wakamatsu, and Seiji Nihei and Jiro Takahira, Bandai-machi, Yama-gun, Japan, assignors to Nisso Kinzoku Kabushiki Kaisha, Tokyo-to, Japan
Original application Apr. 9, 1968, Ser. No. 719,951, now Patent No. 3,579,327, dated May 18, 1971. Divided and this application Aug. 6, 1970, Ser. No. 61,859
Int. Cl. C22c 17/00; C22f 19/26, 23/04
U.S. Cl. 75—.5 A                    1 Claim

ABSTRACT OF THE DISCLOSURE

Zinc dust containing a small amount of antimony or antimony and lead as alloy elements is added into an electrolyte used in hydrometallurgy of zinc, in order to remove cobalt impurities from the electrolyte of zinc sulfate solution.

---

Figure 1:
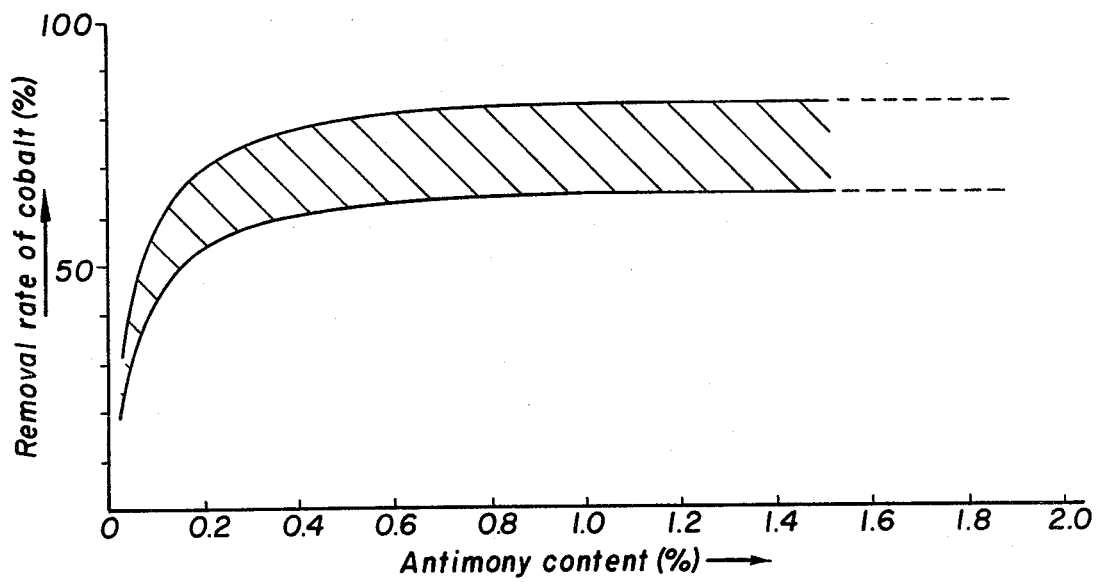

This is a division of application Ser. No. 719,951, filed April 9, 1968, now U.S. Pat. No. 3,579,327.

This invention relates to zinc dust applied to removing cobalt impurities from a contaminated electrolyte of zinc hydrometallurgy and a process for such removal of cobalt impurities, and more particularly concerns zinc dust for precipitating cobalt impurities contained in the electrolyte of a zinc sulfate solution at a purification step of the electrolyte, and a process for precipitating cobalt impurities contained in the electrolyte of the zinc sulfate solution at a purification step of the electrolyte by means of said zinc dust.

In the practice of electrolytic refining of zinc, a zinc sulfate solution made as electrolyte from calcine of zinc (i.e., calcine of zinc ore or roasted zinc ore) with aqueous sulfuric acid is contaminated with iron, antimony, arsenic, copper, cadmium, nickel, cobalt and the like, as impurities carried from the ore, which have to be removed at a purification step. Iron, antimony and arsenic are removed by a known procedure of oxidation and neutralization in which iron precipitates in the form of a ferric hydroxide adsorbing antimony and arsenic.

Generally, after the removal of iron, antimony and arsenic, the solution is purified by using zinc dust or some reagents in multi-stage purification in order to remove a major part of copper, cadmium, nickel and cobalt. In the first stage the major part of copper, cadmium and nickel is removed, and in the second step cobalt is removed, and in the last step the remaining cadmium is thoroughly eliminated.

In the purification step the greatest difficulty encountered is the removal of cobalt. In other words, copper is easily removed by cementation with the equivalent amount of zinc dust and cadmium is similarly precipitated with several times the equivalent amount of zinc dust; however, it is hardly possible to remove cobalt by using much zinc dust, even if several handred times of ordinary zinc dust is used.

Consequently, various conventional processes were proposed for removing cobalt such as the "Arsenite method" and "β-Naphthol process."

The "Arsenite method" is a process in which arsenous acid and zinc dust are added in the presence of copper; however, the process has the shortcomings of a comparatively high operational temperature of 75–85° C., and of generation of a highly poisonous gas of arsenuretted hydrogen (i.e., hydrogen arsenide), which requires perfect protection from inhalation of the gas to comply with hygenic regulations.

Further in the "β-naphthol method," β-naphthol, nitrous acid and sodium hydroxide are added and cobalt is removed by precipitation of a complex salt of cobalt with α-Nitroso β-Naphthol, however, this process has the defect that the nitrite ion remaining in the solution causes a corrosion of anode lead and lowers the current efficiency at a step of electrolysis.

Besides the above mentioned processes, there are proposed the "Antimony method," "Tellurium method" or "Mercury sulfate method" in which antimonic salt and/or antimony, or tellurium oxide or mercury sulfate are used. The antimony method has defects of increasing the antimony concentration in the solution after the treatment. The other two methods are not economical and therefore not commercially useful.

We have now found that zinc dust containing a small amount of antimony as an alloy component is superior in the removal of cobalt from an electrolyte consisting of zinc sulfate solution without increasing the antimony concentration in the solution, and zinc dust containing antimony and lead as alloy components gives a better result for the removal of cobalt.

Accordingly, the first object of this invention is to provide a process and a zinc dust for almost completely removing cobalt from zinc sulfate solution.

The second object of this invention is to economize the amount of zinc dust used.

The third object is to provide a simple and safe process free from generation of poisonous gas.

Still another object is to provide zinc dust suited for efficient removal of cobalt in the electrolytic zinc process.

Other objects and advantages of this invention will further become apparent hereinafter from the detailed description and the accompanying drawings in which FIGS. 1 to 6 are graphs showing the rate of cobalt removal under different conditions.

It was found that the cobalt precipitating effect of zinc dust containing antimony or antimony and lead as alloy components, from an electrolyte consisting of zinc sulfate solution to be used in zinc hydrometallurgy, depends on the contents of antimony; but it also depends on the manufacturing process of the zinc dust, that is, to say even in the case of the same composition, the effect is changed by the difference of the particle size and crystalline state of the alloy of the dust.

Figure 2:
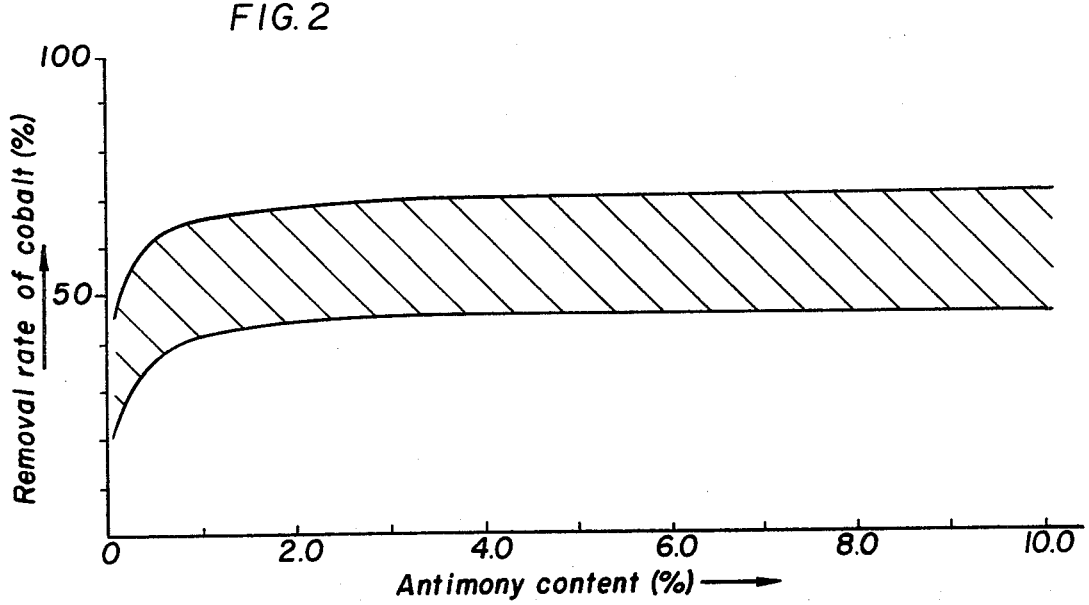

For example, the difference is shown in FIGS. 1 and 2. In the case of FIG. 1, 2.0 g./litre of zinc dust containing 0.02–2.0% antimony as an alloy component produced by a distillation process was used to remove cobalt from zinc sulfate solution containing 190 g./litre of zinc and 20 mg./litre of cobalt.

After 30 minutes of treatment at 80° C., the removal rate of cobalt (percent) was measured.

According to the FIG. 1, the removal rate of cobalt goes up steeply in conformity to the variation of antimony content in the range of 0.02–0.1%. Then, the removal rate of cobalt increases gradually until it reaches 0.2% and then is slightly increased until it reaches 2.0%.

In case of FIG. 2, 2.0 g./litre of zinc dust containing 0.02–10% antimony as an alloy component produced by the atomization method was used for a zinc sulfate solution containing 190 g./litre of zinc and 20 mg./litre of cobalt at a temperature of 85° C. for 120 minutes.

The removal rate of cobalt sharply goes up in conformity to the antimony content in the range of 0.01–0.5% and then gradually increases until it reaches about 1.0%.

In FIGS. 1 and 2, the removal rate of cobalt has a breadth of deviation shown by the two curves.

In the use of employing zinc dust containing antimony, a part of precipitated cobalt tends to re-dissolve, and consequently the rate can not be increased up to 90–95%.

Figure 3:
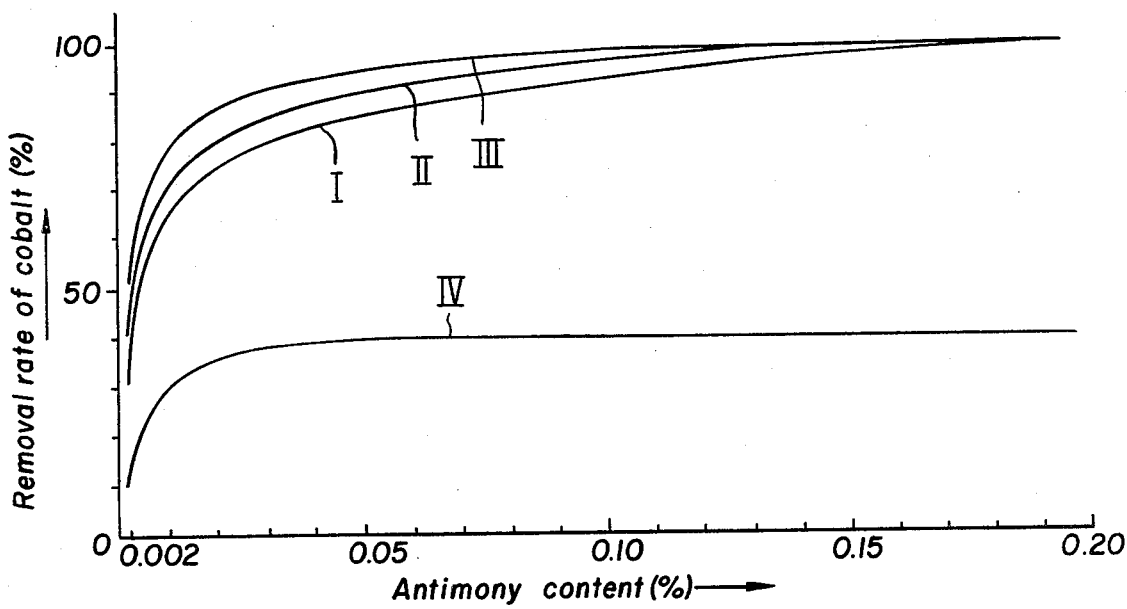

In order to eliminate the above mentioned defect, the inventors continued their research and as a result discovered that zinc dust containing lead in addition to antimony shows a higher ability for removal of cobalt and can prevent its re-dissolution. In FIG. 3, the result of removal rate of cobalt is shown where lead is added. In this case, 2.0 g./litre of distilled zinc dust containing 0.05–10% lead and 0.002–0.2% antimony was added to the zinc sulfate solution (content of zinc: 190 g./litre) containing 20 mg./litre of cobalt and the rate was measured after a 150 minute treatment at 70° C.

Curve I shows the removal rate of cobalt when a distilled zinc dust containing 0.05% lead and 0.002–0.2% antimony was used and each of curves II–IV shows the results in cases of using zinc dust containing 0.3% lead, 3% and 10%.

According to FIG. 3, the rate rapidly rises up in conformity to the variation of antimony content of 0.002–0.005% and then gradually increases until it reaches 0.07% and thereafter almost no further variation is observed. The zinc dust containing 3% lead (curve III) gives the best result.

Figure 4:
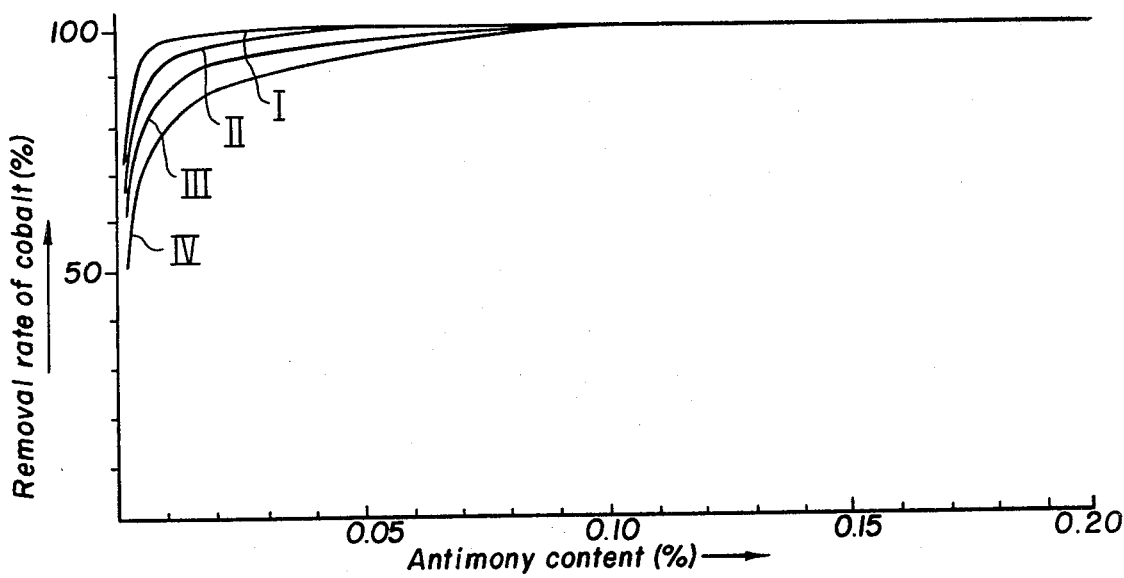

In FIG. 4, the changes of the removal rate of cobalt under different temperatures is shown. In these cases, 2.0 g./litre of distilled zinc dust containing 3% lead and 0.002–0.2% antimony was added to zinc sulfate solution (content of zinc: 190 g./litre) containing 20 mg./litre. The curves I–IV show data obtained by treatments at 85, 80, 75 and 70° C., respectively for 150 minutes.

According to FIG. 4, almost 100% of the rate is observed under the condition that zinc dust containing 3% lead and 0.02% antimony or more was used at treatment temperature of 85° C.

Further in the case of treatment below 75° C., 100% of removal rate of cobalt is observed when zinc duct containing antimony in the excess of 0.1% is used.

Figure 5:
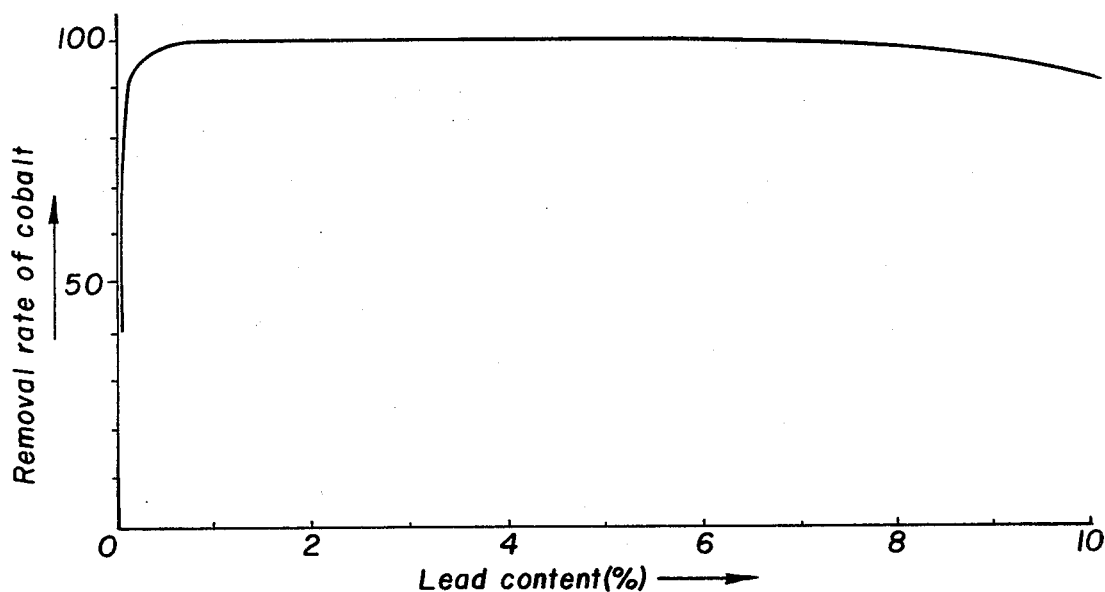

FIG. 5 shows the movement of the removal rate of cobalt corresponding to the change of the amount of lead conttained in the dust at a treating temperature of 70° C. after 150 minutes treatment. In that case, zinc dust containing 0.1% antimony and lead in a range of 0–10% were added to the zinc sulfate solution (content of zinc: 190 g./litre) containing 20 mg./litre cobalt. According to FIG. 5, the addition of lead at the content of 0.05–0.3% rapidly increases the rate and at the content of 0.3–0.7% causes gradual increase. In the range of 0.7–7%, 100% of the rate was observed, and then the rate gradually drops.

Figure 6:
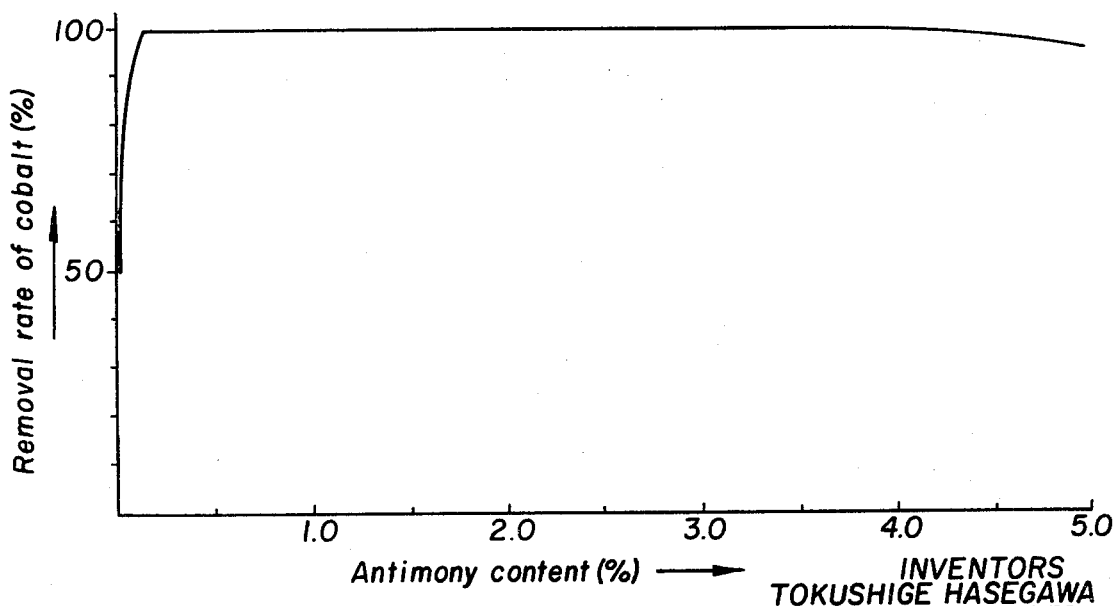

In FIG. 6, the curve shows the removal rate of cobalt when 2.0 g./litre of atomized zinc dust containing 5% lead and 0.01–5% antimony was added to zinc sulfate solution (content of zinc: 190 g./litre) containing 20 mg./litre cobalt at 75° C.; the result was measured after 120 minutes treatment. According to FIG. 6, the removal rate increases rapidly in the range of 0.02–0.5% of antimony content and almost 100% of the rate maintained in the range of 0.1–3.0% or more.

Consequently, it is concluded that zinc dust containing 0.002–5% antimony and 0.05–10% lead as alloy components is preferably used for the purpose of this invention.

In this process, the reason why cobalt ion is easily replaced with zinc dust containing antimony as an alloy component is believed to be because antimony possesses a large affinity to cobalt, and antimony and zinc in a particle, form a local electric cell wherein antimony acts as cathode.

Zinc in the particle dissolves into the electrolyte consisting of zinc sulfate solution and simultaneously cobalt precipitates around the antimony having good affinity to cobalt. Further, antimony causes zinc to dissolve more readily and serves to feed electrons so that the cobalt ion may be converted into metal. To explain the phenomenon of the redissolution of cobalt it is assumed that the component of particle becomes cobalt and antimony only after all the zinc has been spent and dissolved into the solution during the precipitation of cobalt and the particle then forms a local cell of cobalt and antimony, whereupon the precipitated cobalt begins to redissolve into the solution. However, in the case that lead is added in zinc dust as a component thereof, lead being insoluble in the solution of zinc sulfate and stable electro-chemically, saves antimony and zinc from contacting with the solution by enveloping them, and a local cell of cobalt and antimony is scarcely formed. In this invention, the process of the purification of the electrolyte consisting of zinc sulfate solution is carried out in the same way as by the usual addition of zinc dust.

The zinc dust of this invention is added into the solution in powder form as a slurry or in any other preferable form, and the zinc dust is kept suspended in the solution. In the purification step, the step of removing cobalt of this invention is taken after the removal of iron, preferably also after the removal of copper and cadmium.

In the purification step of the electrolyte of zinc hydrometallurgy by employing this invention, cobalt is almost entirely removed from the solution providing many advantages. Thus, the temperature of the operation may be lowered to 60–70° C. and no poisonous gas is generated; also the amount of zinc dust used in the purification step is one quarter or less of the amount of zinc dust used in the conventional process, and the concentration of cobalt of the purified zinc sulfate solution is reduced to one thirtieth or fortieth of the concentration in a common process. Further, cobalt precipitated in the zinc sulfate solution is not re-dissolved. Finally the treatment is very simple and safe, and consequently the cost of the purification of zinc sulfate solution is considerably reduced.

Zinc dust containing antimony or antimony and lead as alloy components used in this invention can easily be prepared by a well kown process, such as atomizing, the vertical electrothermic retort distillation method, and many other methods and any zinc dust can be used in this invention so far as it contains antimony and antimony with lead as alloy components.

For example zinc dust of the solid solution type alloy produced by the atomizing processes or zinc dust of segregation type alloy made by the distillation process can be advantageously used in this invention.

The process and zinc dust of this invention may be more fully understood from the following examples offered by way of illustration and not by way of limitation.

EXAMPLE 1

2.0 g./litre of distilled type zinc dust containing 0.003% of antimony and 1.02% of lead was added into a neutral zinc sulfate solution which contained 195 g./litre of zinc and 20 mg./litre of cobalt and was maintained at a temperature of 85° C. under agitation. Then, after having added the zinc dust the amount of residual cobalt in the solution, was measured. The amounts found were 10.3 mg./litre, 6.5 mg./litre, 3.6 mg./litre, 1.8 mg./litre and 1.0 mg./litre, respectively, in intervals of 30 minutes, 60 minutes, 90 minutes, 120 minutes and 150 minutes.

EXAMPLE 2

2.0 g./litre of distilled type zinc dust, containing 0.04% of antimony and 0.99% of lead, was added into a neutral solution of dissolved zinc which contains 190 g./litre of zinc and 20 mg./litre of cobalt and was agitated at 70° C. after having added zinc dust, the amount of residual cobalt in the neutral zinc sulfate solution, was measured in intervals. Found were 10.3 g./litre, 6.5 mg./litre, 3.6 mg./litre, 1.8 mg./litre and 1.0 mg./litre, respectively, obtained in intervals of 30 minutes, 60 minutes, 90 minutes, 120 minutes and 150 minutes.

EXAMPLE 3

2.0 g./litre of distilled type zinc dust, containing 0.03% of antimony and 2.68% of lead, was added into a neutral zinc sulfate solution which contains 190 g./litre of zinc, 20 mg./litre of copper and 20 mg./litre of cobalt.

The resulting mixture was agitated at 70° C. after addition of zinc dust, the amount of residual cobalt, was measured. The measured values 8 mg./litre, 3.3 mg./litre, 0.8 mg./litre and less than 0.1 mg./litre were respectively obtained in the course of 30 minutes, 60 minutes, 90 minutes and 120 minutes.

EXAMPLE 4

2.0 g./litre of distilled type zinc dust containing 0.136% of antimony and 2.82% of lead was added into a neutral zinc sulfate solution which contains 190 g./litre of zinc and 20 mg./litre of cobalt. The resulting mixture was agitated at 70° C. After addition of zinc dust, the amount of residual cobalt was measured. The measured values i.e. 6.2 mg./litre, 1.2 mg./litre and less than 0.1 mg./litre were obtained respectively in the course of 30 minutes, 60 minutes and 90 minutes.

EXAMPLE 5

2.0 g./litre of atomized type zinc dust, containing 0.19% of antimony and 2.5% of lead was added in a neutral zinc sulfate solution, which contains 190 g./litre of zinc, 20 mg./litre of copper and 20 mg./litre of cobalt, and was agitated at the temperature of 80° C. After addition of zinc dust, the residual cobalt in the solution was measured 5.1 mg./litre, 0.4 mg./litre and less than 0.1 mg./litre in the course of 30 minutes, 60 minutes and 90 minutes.

EXAMPLE 6

2.0 g./litre of atomized type zinc dust, containing 4.35% of antimony and 2.84% of lead, was added in a neutral zinc sulfate solution, which contains 190 g./litre of zinc, 20 mg./litre of copper and 20 mg./litre of cobalt and was agitated at a temperature of 85° C. The residual cobalt in the solution was measured. As a result, the values i.e. 0.3 mg./litre and less than 0.1 mg./litre were obtained, respectively in the course of 30 minutes and 60 minutes.

EXAMPLE 7

54.0 kg. of zinc (29.3%), 10.5 kg. of antimony (5.7%) and 120.0 kg. of lead (65.0%) were melted together in a distillation retort.

The mixture distilled at 1160° C. and distilled zinc dust having a 6μ average particle diameter was obtained. The zinc dust contained 2.92% of lead and 0.095% of antimony as alloy components. The zinc dust could be produced continuously by constant addition of the metal at the same rate of the consumption of the metal.

EXAMPLE 8

19.4 kg. of zinc (96.8%), 0.04 kg. of antimony (0.20%) and 0.6 kg. of lead (3%) were melted down at 520° C. and were atomized. Atomized zinc dust of 20μ average particle diameter could be obtained. The zinc dust contained 0.19% of antimony, 2.5% of lead and 97.3% of zinc.

What we claim is:

1. Distilled or atomized zinc dust alloy consisting essentially of, by weight, 0.002 to 5% antimony, 0.05 to 10% lead and the remainder zinc.

References Cited

UNITED STATES PATENTS

| | | | |
|---|---|---|---|
| 629,905 | 8/1899 | Hood | 75—178 R X |
| 2,503,479 | 4/1950 | Griffith et al. | 23—125 |
| 1,090,661 | 3/1914 | Urguhart | 75—109 |
| 1,920,442 | 8/1933 | Tainton | 23—125 |
| 1,336,386 | 4/1920 | Sulman et al. | 23—125 |
| 1,429,131 | 9/1922 | Field | 23—125 |
| 1,733,676 | 10/1929 | Stevens et al. | 23—125 |

FOREIGN PATENTS

| | | | |
|---|---|---|---|
| 704,662 | 4/1941 | Germany | 75—178 R |

OTHER REFERENCES

Bennett, Concise Chemical and Technical Dicionary, Chemical Publishing Co., N.Y., 1962, p. 865.

GEORGE T. OZAKI, Primary Examiner

U.S. Cl. X.R.

75—178R, 109, 119, 120; 23—125